US009646457B2

(12) United States Patent
DeWaal et al.

(10) Patent No.: US 9,646,457 B2
(45) Date of Patent: *May 9, 2017

(54) GAMING SYSTEM AND METHOD FOR PROVIDING ENHANCED WAGERING OPPORTUNITIES

(71) Applicant: IGT, Las Vegas, NV (US)

(72) Inventors: Daniel J. DeWaal, Las Vegas, NV (US); Hans Elias, Hertfordshire (GB); Richard J. Schneider, Las Vegas, NV (US); Anthony J. Baerlocher, Henderson, NV (US)

(73) Assignee: IGT, Las Vegas, NV (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/704,489

(22) Filed: May 5, 2015

(65) Prior Publication Data

US 2015/0235514 A1 Aug. 20, 2015

Related U.S. Application Data

(63) Continuation of application No. 13/431,449, filed on Mar. 27, 2012, now Pat. No. 9,053,606, which is a (Continued)

(51) Int. Cl.
*A63F 13/00* (2014.01)
*G07F 17/32* (2006.01)

(52) U.S. Cl.
CPC ...... *G07F 17/3239* (2013.01); *G07F 17/3225* (2013.01); *G07F 17/3244* (2013.01)

(58) Field of Classification Search
None
See application file for complete search history.

(56) References Cited

U.S. PATENT DOCUMENTS

| | | | |
|---|---|---|---|
| 4,467,424 | A | 8/1984 | Hedges et al. |
| 4,636,951 | A | 1/1987 | Harlick |

(Continued)

FOREIGN PATENT DOCUMENTS

| | | |
|---|---|---|
| JP | 10-277243 | 10/1998 |
| JP | 2003-052900 | 2/2003 |

(Continued)

OTHER PUBLICATIONS

"2006 Global Gaming, Expo report—part 3" article written by John Grochowski, published Dec. 19, 2006.

(Continued)

*Primary Examiner* — Sunit Pandya
(74) *Attorney, Agent, or Firm* — Neal, Gerber & Eisenberg LLP

(57) ABSTRACT

A gaming system including a central server linked to a plurality of gaming machines. In one embodiment, the gaming system provides players with one or more enhanced wagering opportunities. One enhanced wagering opportunity enables a player to continue playing one or more primary games at the maximum wager even if the player's continued play causes the gaming device's credit meter to fall below zero credits. In one such embodiment, after playing one or more maximum wager games which cause the credit meter to drop below zero, the player's player tracking account is utilized to cover any amount of credits the gaming device's credit meter is below zero.

17 Claims, 11 Drawing Sheets

Related U.S. Application Data continuation of application No. 12/015,974, filed on Jan. 17, 2008, now Pat. No. 8,152,629.

(60) Provisional application No. 60/886,610, filed on Jan. 25, 2007.

(56) References Cited

U.S. PATENT DOCUMENTS 4,669,731 A 6/1987 Clarke
4,764,666 A 8/1988 Bergeron
4,880,237 A 11/1989 Kishishita
4,991,848 A 2/1991 Greenwood et al.
5,123,649 A 6/1992 Tiberio
5,178,390 A 1/1993 Okada
5,275,400 A 1/1994 Weingardt et al.
5,287,269 A 2/1994 Dorrough et al.
5,401,023 A 3/1995 Wood
5,401,024 A 3/1995 Simunek
5,429,361 A 7/1995 Raven et al.
5,511,781 A 4/1996 Wood et al.
5,551,692 A 9/1996 Pettit et al.
5,570,885 A 11/1996 Ornstein
5,613,912 A 3/1997 Slater
5,639,088 A 6/1997 Schneider et al.
5,741,183 A 4/1998 Acres et al.
5,743,800 A 4/1998 Huard et al.
5,758,875 A 6/1998 Giacalone, Jr.
5,762,552 A 6/1998 Vuong et al.
5,766,075 A 6/1998 Cook et al.
5,768,382 A 6/1998 Schneier et al.
5,770,533 A 6/1998 Franchi
5,772,509 A 6/1998 Weiss
5,800,268 A 9/1998 Molnick
5,816,917 A 10/1998 Kelmer et al.
5,830,067 A 11/1998 Graves et al.
5,833,538 A 11/1998 Weiss
5,833,540 A 11/1998 Miodunski et al.
5,836,817 A 11/1998 Acres et al.
5,910,048 A 6/1999 Feinberg
5,970,143 A 10/1999 Schneier et al.
5,980,384 A 11/1999 Barrie
6,001,016 A 12/1999 Walker et al.
6,012,983 A 1/2000 Walker et al.
6,024,643 A 2/2000 Begis
6,050,895 A 4/2000 Luciano, Jr. et al.
6,077,163 A 6/2000 Walker et al.
6,139,430 A 10/2000 Huard et al.
6,146,270 A 11/2000 Huard et al.
6,168,522 B1 1/2001 Walker et al.
6,190,256 B1 2/2001 Walker et al.
6,193,606 B1 2/2001 Walker et al.
6,217,448 B1 4/2001 Olsen
6,244,957 B1 6/2001 Walker et al.
6,244,958 B1 6/2001 Acres
6,267,671 B1 7/2001 Hogan
6,273,820 B1 8/2001 Haste, III
6,299,533 B1 10/2001 Parra et al.
6,306,038 B1 10/2001 Graves et al.
6,309,300 B1 10/2001 Glavich
6,315,662 B1 11/2001 Jorasch et al.
6,318,721 B1 11/2001 Randall et al.
6,319,125 B1 11/2001 Acres
6,319,127 B1 * 11/2001 Walker .................... G07F 17/32 463/25
6,331,144 B1 12/2001 Walker et al.
6,343,989 B1 2/2002 Wood et al.
6,402,148 B1 6/2002 Saruwatari
6,409,172 B1 6/2002 Vancura
6,506,118 B1 1/2003 Baerlocher et al.
6,508,710 B1 1/2003 Paravia et al.
6,527,638 B1 3/2003 Walker et al.
6,605,001 B1 8/2003 Tarantino
6,607,438 B2 8/2003 Baerlocher et al.
6,632,140 B2 10/2003 Berman et al.
6,645,077 B2 * 11/2003 Rowe ...................... A63F 13/12 463/25
6,709,331 B2 3/2004 Berman
6,722,983 B2 4/2004 Kaminkow et al.
6,726,563 B1 4/2004 Baerlocher et al.
6,726,565 B2 4/2004 Hughs-Baird
6,769,983 B2 8/2004 Slomiany
6,846,238 B2 1/2005 Wells
6,935,949 B1 8/2005 Murphy
7,029,395 B1 * 4/2006 Baerlocher ......... G07F 17/3258 463/16
7,140,964 B2 11/2006 Walker et al.
7,329,179 B2 * 2/2008 Baerlocher ............. G07F 17/32 463/20
7,351,146 B2 4/2008 Kaminkow
2002/0058542 A1 5/2002 Roethel et al.
2002/0125641 A1 9/2002 Moody
2002/0128057 A1 9/2002 Walker et al.
2003/0114217 A1 * 6/2003 Walker .................... G07F 17/32 463/20
2003/0144053 A1 7/2003 Michaelson
2003/0162582 A1 8/2003 Gordon
2003/0220138 A1 * 11/2003 Walker .................... G07F 17/32 463/25
2003/0224854 A1 12/2003 Joao
2004/0014522 A1 * 1/2004 Walker .................... G07F 17/32 463/25
2004/0063492 A1 4/2004 Baerlocher et al.
2004/0063494 A1 4/2004 Oram et al.
2004/0102238 A1 5/2004 Taylor
2004/0176156 A1 * 9/2004 Walker .................... G07F 17/32 463/16
2005/0049039 A1 3/2005 Webb et al.
2005/0054409 A1 3/2005 Cannon
2005/0085288 A1 4/2005 Schugar et al.
2006/0025207 A1 2/2006 Walker et al.
2006/0025254 A1 2/2006 Myers
2006/0040730 A1 2/2006 Walker et al.
2006/0040732 A1 2/2006 Baerlocher et al.
2006/0128457 A1 6/2006 Cannon
2006/0172794 A1 8/2006 Walker et al.
2006/0248025 A1 11/2006 Walker et al.
2006/0252511 A1 11/2006 Walker et al.
2006/0252512 A1 11/2006 Walker et al.
2006/0252513 A1 11/2006 Walker et al.
2006/0252514 A1 11/2006 Walker et al.
2006/0252517 A1 11/2006 Walker et al.
2006/0287072 A1 12/2006 Walker et al.
2007/0001397 A1 1/2007 Walker et al.
2007/0001398 A1 1/2007 Walker et al.
2007/0054726 A1 3/2007 Muir et al.
2007/0087818 A1 * 4/2007 Walker .................... G07F 17/32 463/25
2007/0155482 A1 7/2007 Walker et al.
2007/0155483 A1 7/2007 Walker et al.
2007/0155484 A1 7/2007 Walker et al.
2007/0254732 A1 11/2007 Walker et al.
2007/0293306 A1 * 12/2007 Nee ......................... G07F 17/32 463/25
2008/0076531 A1 3/2008 Baerlocher et al.
2008/0076532 A1 3/2008 Graham et al.
2008/0076542 A1 3/2008 Iddings et al.
2008/0096650 A1 4/2008 Baerlocher et al.
2008/0108425 A1 5/2008 Oberberger
2008/0113771 A1 * 5/2008 Baerlocher ............. G07F 17/32 463/25
2008/0305862 A1 * 12/2008 Walker .................... G07F 17/32 463/26
2009/0291736 A1 * 11/2009 Walker ................ G07F 17/3244 463/20
2010/0124971 A1 * 5/2010 Baerlocher ......... G07F 17/3258 463/20

FOREIGN PATENT DOCUMENTS

JP 2004-344511 12/2004
WO WO 2005/082094 9/2005

(56) References Cited

FOREIGN PATENT DOCUMENTS

| | | |
|---|---|---|
| WO | WO 2006/020692 | 2/2006 |
| WO | WO 2007/146205 | 2/2007 |
| WO | WO 2007/059418 | 5/2007 |

OTHER PUBLICATIONS

Final Office Action, dated Oct. 17, 2008, in U.S. Appl. No. 10/420,066.

Response to Final Office Action and RCE After Supplemental Appeal Brief, dated Jan. 27, 2010, in U.S. Appl. No. 10/420,066.

* cited by examiner

GAMING SYSTEM AND METHOD FOR PROVIDING ENHANCED WAGERING OPPORTUNITIES

PRIORITY CLAIM

This application is a continuation of, claims priority to and the benefit of U.S. patent application Ser. No. 13/431,449, filed on Mar. 27, 2012, which is a continuation of, claims priority to and the benefit of U.S. patent application Ser. No. 12/015,974, filed on Jan. 17, 2008, now U.S. Pat. No. 8,152,629, which claims priority to and the benefit of U.S. Provisional Patent Application Ser. No. 60/886,610, filed on Jan. 25, 2007, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (i.e., the higher the wager, the higher the award). Symbols or symbol combinations which are less likely to occur usually provide higher awards.

In such known gaming machines, the amount of the wager made on the base game by the player may vary. For instance, the gaming machine enables the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game has one or more paylines and the slot game enables the player to make a wager on each payline in a single play of the primary game. Slot games with 1, 3, 5, 9, 15 and 25 lines are widely commercially available. Thus, it is known that a gaming machine, such as a slot game, enables players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. It should be appreciated that different players play at substantially different wagering amounts or levels and at substantially different rates of play.

Secondary or bonus games are also known in gaming machines. These secondary or bonus games usually provide an additional award to the player. Such bonus awards are accounted for when determining the overall paytable for the gaming machine. Secondary or bonus games usually do not require an additional wager by the player to be activated. Secondary or bonus games are often activated or triggered upon an occurrence of a designated triggering symbol or triggering symbol combination in the primary or base game of the gaming machine. For instance, a bonus symbol occurring on a payline on the third reel of a three reel slot machine triggers the secondary bonus game on that gaming device. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Certain known gaming machines offer the possibility of winning higher awards (such as a progressive award) when a player places a maximum bet or maximum wager. Other known gaming machines offer the possibility of winning a bonus event or bonus game when a player places a maximum bet or maximum wager. There is a need to develop new and different award opportunities associated with players placing a maximum bet or maximum wager.

Player tracking systems are also known. Player tracking systems enable gaming establishments to recognize the value of customer loyalty through identifying frequent customers and rewarding them for their patronage. The cumulative history of a particular player's gaming activity, which is included in a player profile, enables gaming establishments to target individual players with direct marketing promotions or customized compensation plans. In existing player tracking systems, a player is issued a player identification card which has an encoded player identification number that uniquely identifies the player. Player tracking on gaming machines, (such as slot machines) is typically accomplished with a card reader. When the player first sits down at a gaming machine, the player inserts the card into the card reader. The card reader reads the player identification number from the player tracking card and the gaming device communicates information through a network to a central computer regarding the player's subsequent gaming activity. Based on this communicated information or data, the gaming establishment classifies each player and provides one or more of such players certain benefits based on these classifications.

Historically, with stand-alone gaming machines, the gaming machine does not identify the player currently playing the game. The gaming machine sends the information read from the player tracking card to the player tracking system. The player tracking system then identifies the player and tracks their play. There is a need to further develop ways to configure gaming machines to provide players identified by the player tracking system with better gaming experiences.

Gaming establishment or casino loyalty programs are also well known. A casino loyalty programs works in conjunction with a player tracking system to offer incentives to players in exchange for the player's loyalty to and play history at the gaming establishment. Such loyalty incentives are often provided and funded by the gaming establishment's marketing department. These marketing department promotions are generally not accounted for in determining the overall paytable for the gaming machines; rather, they are funded by marketing dollars.

One known way to provide loyalty incentives to players is by offering promotional credits to be utilized for play of a primary wagering game. Such promotional credits are often offered as a one time event such as for a player signing up for a player tracking card. It is known that that providing promotional credits to a player is often preferable over providing non-promotional or cash credits to a player because known promotional credits are not immediately redeemable by a player for cash and must be played through a gaming machine. These promotional credits are typically redeemed by a player at the beginning of a play session; rather than at the end of a play session. These promotional offers are not made to players on a real-time basis based on the current play session or portions of the current play session.

SUMMARY

In various embodiments, the gaming system and method disclosed herein provides players with different bet or wager opportunities to optimize the potential payout of the gaming device. In one such embodiment, the gaming system identifies a player (via a player tracking system) and, based on data or information associated with the identified player, provides the player one or more specifically tailored wager opportunities to maximize the potential payout the player may win from their currently played gaming device. In such embodiments, the gaming system and method disclosed herein enables certain players of certain player tracking statuses to maximize their average expected payout for one or more wagering games played by providing different bet options to such players that would otherwise not be available to unidentified players or players of a lesser player status. For example, the gaming system may identify a first player of a first player status (as determined via the player tracking system) and enable the first player to play a game utilizing a first wagering configuration. In this example, the gaming system may simultaneously or subsequently identify a second player of a second, different player status and enable the second player to play the same game utilizing a second, different wagering configuration. Such different wagering configurations for different players provides an aspect of personalization that will enhance the gaming experience of many players.

In one embodiment, the gaming system disclosed herein includes a central server, central controller or remote host in communication with or linked to a plurality of gaming machines or gaming devices. In one embodiment, the central server is in communication with one or more player tracking or player loyalty systems to identify players playing at one or more of the gaming devices in the gaming system in a conventional manner. This enables the gaming system to identify the player currently playing a gaming device and, based on suitable information associated with the identified player, determine whether to provide zero, one or more enhanced wagering or betting opportunities to the player (which may not be available to other players). In this embodiment, if the gaming system determines to provide at least one enhanced wagering opportunity to the player, the gaming system determines, based on a set of pre-defined rules and information associated with the identified player, one or more enhanced wagering opportunities to provide to the player for one or more future games. As described in more detail below, any suitable wagering feature, from enabling the gaming device's credit meter to drop below zero credits (such that the player receives the benefits of placing a designated wager level such as the maximum wager amount) to enabling the player to play a set number of games for a set wager amount (wherein the total cost of the set number of games is greater than the set wager amount) may be implemented as an enhanced wagering opportunity in accordance with the gaming system and methods disclosed herein.

In one such embodiment, after the gaming system initially identifies the player, the gaming system determines whether to offer the player an enhanced wagering opportunity, if necessary, to supplement one or more of the player's subsequent wagers. In this embodiment, the gaming system determines whether to offer the player the enhanced wagering opportunity based on the player's identity and independent of any aspects of the player's subsequent gaming activity. For example, if a player of a designated player tracking status begins playing a gaming device, the gaming system determines that if the player depletes most or all of their available credits on the gaming device's credit meter during the course of the player's upcoming gaming activity (such that they do not have the required credits to play any additional games at a designated wager level such as at the maximum wager level), whether or not to enable the player to continue playing one or more primary games at the designated wager level such as at maximum wager (to receive the benefits associated with placing the designated wager such as the maximum wager) such that the player's continued play can cause the gaming device's credit meter to fall below zero credits.

In another such embodiment, the gaming system identifies the player currently playing a gaming device and based on player tracking information associated with the identified player along with one or more aspects of any games played, the gaming system determines whether to offer one or more enhanced wagering opportunities to the player. That is, in this embodiment, the gaming system factors in the identity of the player and their recent gaming activity to determine whether or not to provide one or more enhanced wagering opportunities to the player. For example, if a player of a designated player tracking status (such as gold level instead of a bronze level) has been playing at a designated wager level such as a maximum level for a designated number of games and the player depletes most or all of their available credits on the gaming device's credit meter (such that they do not have the required credits to continue to play any additional games at the designated wager level such as the maximum wager level), the gaming device determines whether or not to enable the player to continue playing one or more primary games at the designated wager level such as the maximum wager level (to receive the benefits associated with placing the designated wager level as the maximum wager) such that the player's continued play can cause the gaming device's credit meter to fall below zero credits.

The designated wager level may be any suitable level or designated wager. For example, the designated wager level may be the player wagering on all of the paylines, all of the ways, or all of the hands. In most embodiments, the designated wager level is greater than a minimum wager level for the game. For ease of discussion, the maximum wager on the game is employed throughout this application as the designated wager level; however, it should be appreciated that the designated wager level is not limited to being the maximum wager level.

Thus, in one embodiment, as mentioned above, an enhanced wagering opportunity provided to a player is selectively enabling the player to continue to place maximum wagers at the gaming device when the gaming device's credit meter falls below zero. In this embodiment, if the maximum bet amount is X (which is required for the player to obtain the maximum possible payback) and the gaming device's credit meter only includes Y credits (wherein Y is less than X), the gaming device enables the player to play one or more subsequent wagering games with the maximum bet placed on each subsequent wagering game, even if the gaming device's credit meter falls below zero credits. For example, if the gaming device's credit meter currently has two credits and a maximum wager is three credits, the gaming device enables the player to nonetheless place the maximum wager such that the gaming device's credit meter is reduced to negative one credit.

In one such embodiment, the enhanced wagering opportunity provided to the player enables the player to continue to place maximum wagers at the gaming device (even when the gaming device's credit meter falls below zero) until a designated condition is reached such as until the credit meter reaches a designated negative amount. In another such embodiment, the enhanced wagering opportunity provided to the player enables the player to continue to place maximum wagers at the gaming device (even when the gaming device's credit meter falls below zero) for a designated number of plays. In another such embodiment, the enhanced wagering opportunity provided to the player enables the player to continue to place maximum wagers at the gaming device (even when the gaming device's credit meter falls below zero) for a designated period of time. In different embodiments, the designated negative amount, the designated number of plays and/or the designated period of time which the gaming device enables the credit meter to fall below zero is: (1) predetermined, (2) randomly determined, (3) determined based on the player's status (such as determined through a player tracking system), (4) determined based on a generated symbol or symbol combination or other game event, (5) determined based on a random determination by a central controller, (6) determined based on a random determination by the gaming device, (7) determined based on one or more side wagers placed by the player, (8) determined based on the player's primary game wagers at the gaming device during the player session, (9) determined based on time (such as the time of day), (10) determined based on an amount of coin-in accumulated in one or more pools, (11) determined by the amount of money the player lost in the present play session and/or in one or more previous play sessions, (12) determined based on the length of play of the present play session and/or in one or more previous play sessions, (13) determined based on the coin-in or amounts wagered in the present play session and/or in one or more previous play sessions, (14) determined based on the number of games played in the present play session and/or in one or more previous play sessions, (15) determined based on all or a portion of the player's investment in the gaming session, (16) determined based on a combination of the above, or (17) determined based on any other suitable method, criteria or condition. It should also be appreciated that the gaming system may provide different players different negative limitations. For example, a gold player may be able to go negative to 300 credits, a silver player may be able to go negative 200 credits, and a bronze player may be able to go negative 100 credits. It should also be appreciated that any one or more of the above factors or other suitable factors may be employed to determine if the player is provided the enhanced award opportunity and particularly the negative credit meter feature.

It should be appreciated that when the credit meter is negative, in one embodiment, any credits or amounts won are first applied to the negative balance of credits in the credit meter. For example, if the credit meter is at negative 50 credits and the player wins 75 credits, the credit meter will change to positive 25 credits. Other configurations may be employed to address wins and the functionality of the negative credit meter.

The present disclosure contemplates many different ways to cover a negative credit meter remaining during or at the end of a gaming session. If the casino, gaming establishment or operator desires the player to cover or pay back some or all of the negative credit balance, any of the following suitable methods can be used to cover the negative credit balance depending on the timing, the casino, gaming establishment or operator, the player and the amount negative: (1) player tracking points, (2) future wins (in the present gaming session or a future gaming session), (3) player tracking points while the future wins (in the present gaming session or a future gaming session) are kept by the player, (4) a loan payable at a point in the future, (5) an immediate payment at the end of the gaming session, (6) any combination of these, or (7) any other suitable payment form. The portion the player must pay back can also be determined in any suitable manner such as: (1) the player's player tracking status, (2) the amount won with such play, (3) the of the amount negative balance, (4) any combination of these, or (5) any other suitable criteria. If the casino, gaming establishment or operator does not desire the player to cover or pay back some or all of the negative credit balance, any of the following can be used to cover the negative credit balance: (1) incorporation into the payback percentage or paytable of the gaming machine, (2) marketing dollars, (3) player comps, (4) treatment as a loss, (5) required guaranteed play at certain designated levels (such as max wager) for a designated amount of time or money, (6) payment from a pool, (7) an immediate payment at the end of the gaming session, (8) any combination of these, or (9) or any other suitable payment form.

More specifically, in one such embodiment, the casino, gaming establishment, or operator absorbs the negative balance. In this embodiment, enabling the credit meter to go negative is an award or "comp" provided to the player by the casino, gaming establishment or operator. In one such embodiment, any amount the credit meter is negative after the player stops playing is covered, at least in part, via an amount provided by one or more marketing and/or advertising departments, such as a gaming establishment's marketing department. In another embodiment, if the gaming device's credit meter is still below zero credits after playing a designated number, such as one or more subsequent wagering games, the gaming system utilizes the player's player tracking account to cover any amount of credits the gaming device's credit meter is below zero or negative. That is, the casino, gaming establishment or operator can employ a suitable ratio to deduct from the player's tracking account an amount of player tracking points or player associated promotional credits based on the amount that the gaming device's credit meter is negative. This ratio can be any suitable ratio.

In another embodiment, if the gaming device's credit meter is still below zero credits after playing a designated number, such as one or more subsequent wagering games, the gaming system enables certain players (i.e., players of a designated player status level) to cover, at a later time, the amount the gaming device's credit meter is below zero. In one embodiment, the player may only be required to cover or pay a portion of the negative credit meter balance any other suitable method be employed to cover the rest. The system may require the player to pay at any suitable time and at any suitable location such as cash window or at a kiosk.

The negative balance may be paid by the player using a credit card, a house account or in any other suitable manner. If the casino covers the negative balance, the casino may factor this into the paytable of the gaming machine, or may simply take the negative balance as a loss. It should thus be appreciated that any suitable manner of covering this feature may be implemented in accordance with the gaming system disclosed herein.

In other embodiments, this negative credit meter functionality may be only sometimes offered to the player (i.e., and sometimes not offered to the player). Thus, the enhanced wagering opportunity is selectively provided to the player. The feature may be selectively determined to be provided in any suitable manner. For example, the feature may be provided to a player a designated number of times over a designated period (such as once a week, once a day, and once an hour). Any suitable criteria or conditions may be employed to determine when to provide the feature to a player. It should be appreciated that any time an enhanced award opportunity such as the negative credit balance feature is provided to the player, an appropriate message can be displayed to inform the player of this feature.

In another embodiment, the enhanced wagering opportunity provided to a player enables the player to continue playing one or more wagering games wherein part of any amount won is retained by the gaming establishment. In this embodiment, if the maximum bet amount is X (which is required for the player to obtain the maximum possible payback) and the gaming device's credit meter only includes Y credits (where Y is less than X), to optimize the potential payout of the game, the gaming device enables the player to play one or more subsequent wagering games with the maximum bet placed on each subsequent wagering game wherein a portion of any amount won by the player is retained by the gaming establishment. For example, if a gaming device provides five of the twenty-five credits needed for the player to play a subsequent game with the maximum wager, the gaming system will retain twenty percent of the total win resulting from that subsequent game played. If all of the credits are provided to the player for the wager, the gaming establishment may retain a suitable designated percentage of the win.

In another embodiment, an extra fee is charged for enabling the credit meter to go negative. This can be a one time charge or a charge associated with each wager which causes the credit meter to go negative or further negative. For example, if the maximum wager is 9 credits and if the wager will cause the credit meter to go negative or go further negative, a fee of 1 credit may be charged for each such wager. Thus, in this example, if the credit meter started at zero, the credit meter would be at −10. Any wins from the plays of the game would be applied to this negative credit meter balance. Any suitable amounts may be charged as a fee. Alternatively, when a fee is charged to the player, the player is enabled to keep all of their win or more of their win than they otherwise would be enabled to keep.

It should also be appreciated that the enhanced award opportunity can be determined and provided to the player at the gaming device level and in certain embodiments without having an identification of the player. In one such embodiment, the gaming device analyzes an ongoing gaming session. If the gaming session meets predefined criteria, the gaming device provides the enhanced wagering opportunity for the player. For example, in a gaming session, if the player has made the maximum bet 50 times, the gaming device can provide the player the negative credit meter functionality described above. The criteria may be any suitable criteria. Thus, in this embodiment and certain of the embodiments described above, the gaming system and/or gaming device makes a real-time determination of whether to provide the enhanced award opportunity such as the negative credit meter to the player based at least in part on the portion of the player's current gaming session which has occurred. This functionality provides real-time award of comps or other benefits for the player, which in certain embodiments can be provided to the player without an identification of the player, but rather just based on a play session.

In one embodiment, the enhanced wagering opportunity is provided to a player upon the player inserting money into the gaming device. In another alternative embodiment, the enhanced wagering opportunity is provided to a player upon the gaming system determining that the player has not been playing at the designated wager level such as the maximum level for a designated number of games. In these embodiments, the enhanced wagering opportunity provides that if all the player's subsequent games are played at the maximum bet, the player is guaranteed at least A games where A is greater than gaming device's current credit meter divided by the maximum bet per game. In these embodiments, the gaming system guarantee's that the player is provided a certain number of games played at the maximum wager level, even if the credit meter is required to go negative. That is, the player is provided the benefits of playing at the maximum wager level, but is not penalized upfront for the additional games they are ensured to be able to play. For example, upon inserting money into the gaming device (or alternatively upon the gaming system determining that the player is not placing the maximum bet) to play a $1 maximum bet game, the gaming device enables the player to play at least 25 games at the maximum bet for the set fee of $20 (i.e., five guaranteed additional plays). Accordingly, the player is guaranteed to get more play out of the gaming device than the money they put in.

It should be appreciated that the enhanced wagering opportunities described above each enable the player to play one or more subsequent games at the maximum wager level. Such maximum bet games optimize the potential payout available to the player by, for example, utilizing a paytable with a higher average expected payout than a paytable associated with a wager less than the maximum wager. Accordingly, the gaming system and method disclosed herein provides a gaming system with maximum flexibility in offering enhanced wagering opportunities and further offers the additional benefits associated with players placing a maximum bet or wager to players.

Additional features and advantages are described in, and will be apparent from, the following Detailed Description and the figures.

DETAILED DESCRIPTION

Figure 1:
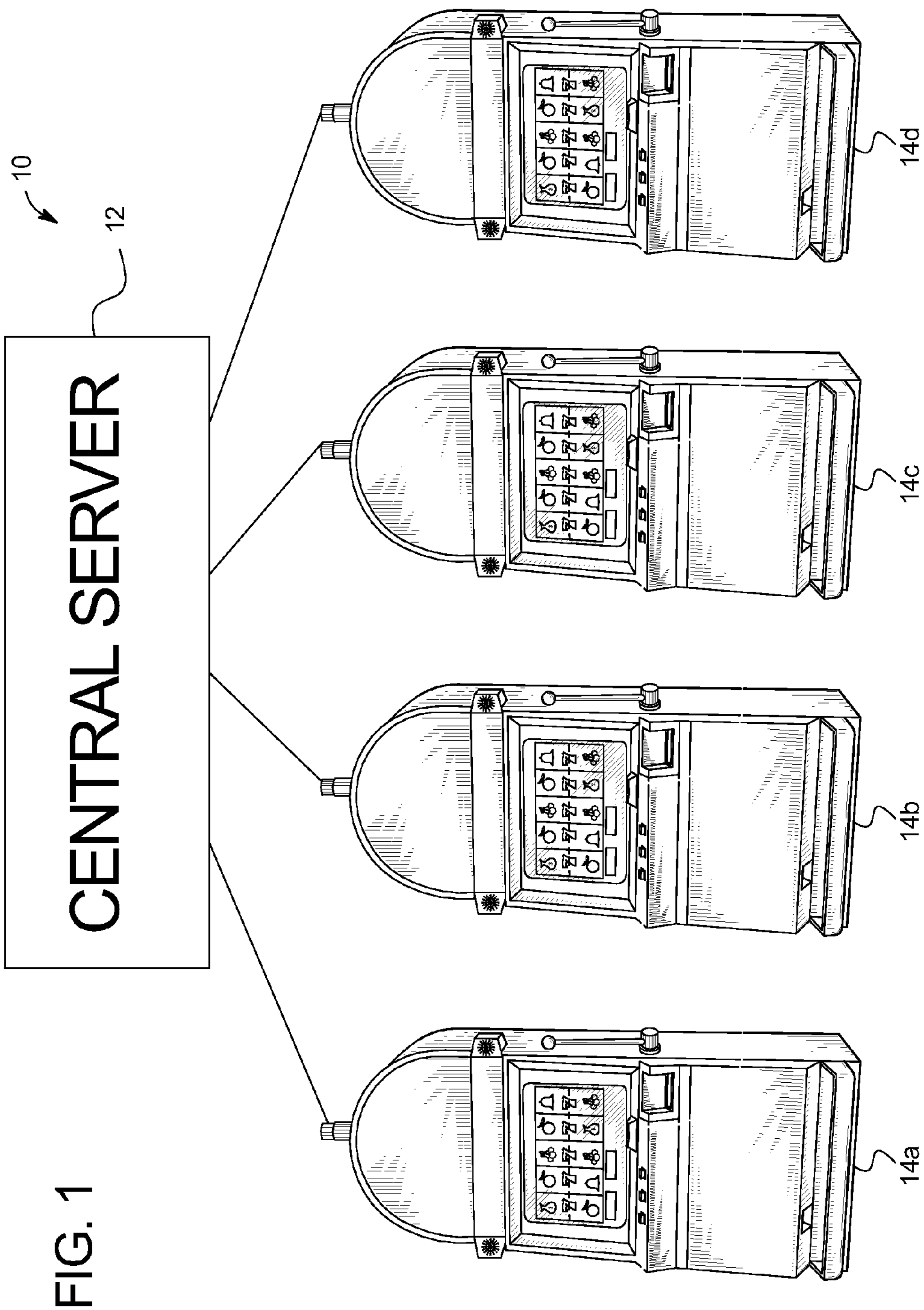
FIG. 1 is a schematic diagram of the central server in communication with a plurality of gaming devices in accordance with one embodiment of the gaming system disclosed herein.

Referring to FIG. 1, one embodiment of the gaming system 10 includes a central server, central controller or remote host 12 and a plurality of gaming machines or gaming devices 14*a*, 14*b*, 14*c* . . . 14*z* in communication with or linked to the central server 12 through a data network or a remote communication link. The number of gaming machines in the gaming system can vary as desired by the implementer of the gaming system. These gaming machines are referred to herein alternatively as the group of gaming machines, the linked gaming machines or the system gaming machines. The linked gaming machines may be of the same type or of different types of gaming machines. The linked gaming machines may have the same primary game or two or more different primary games. The play of each of the gaming machines in the group is monitored by the central server.

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 2A:
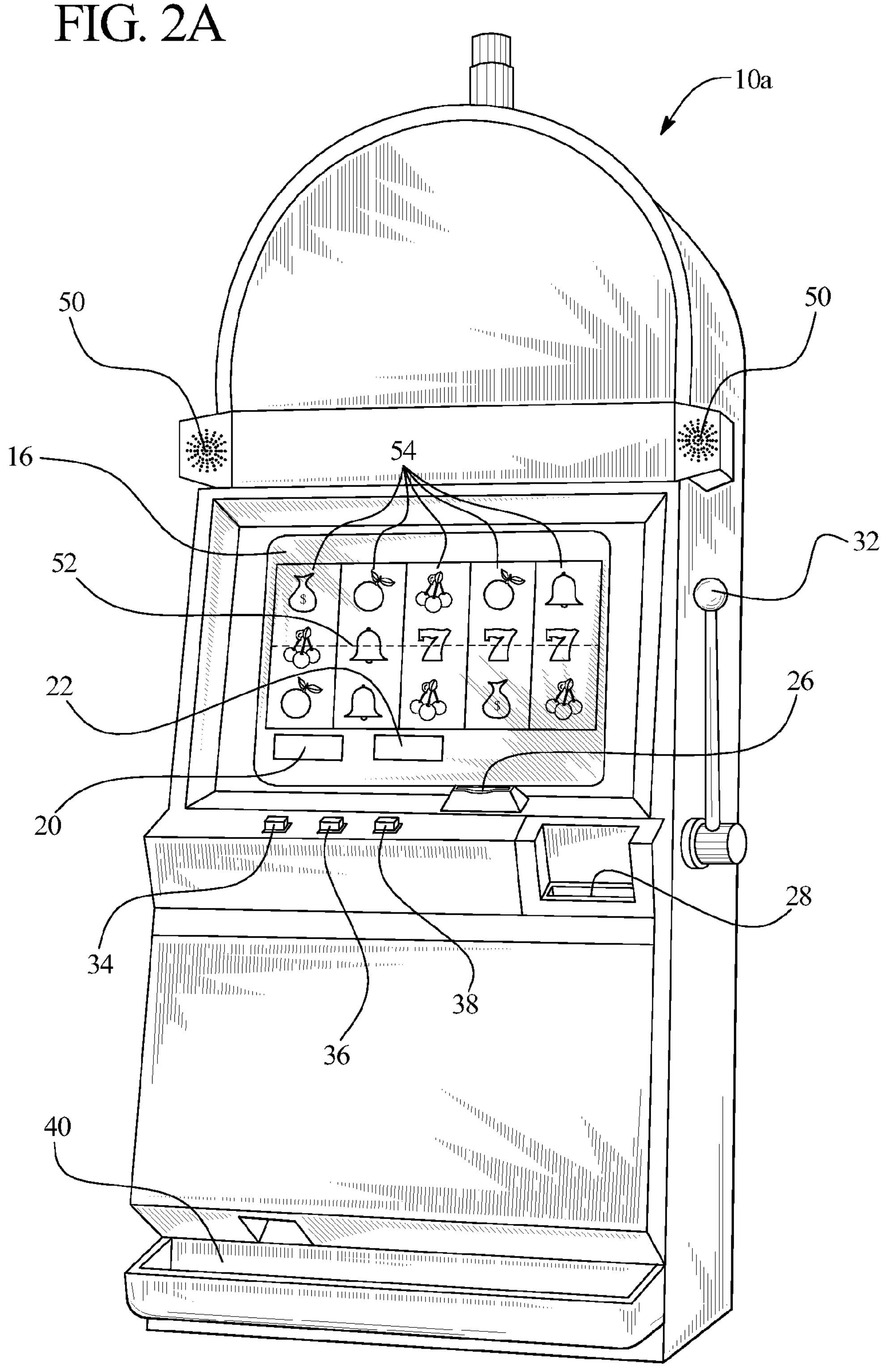
FIGS. 2A and 2B are front perspective views of alternative embodiments of gaming devices disclosed herein.
Figure 2B:
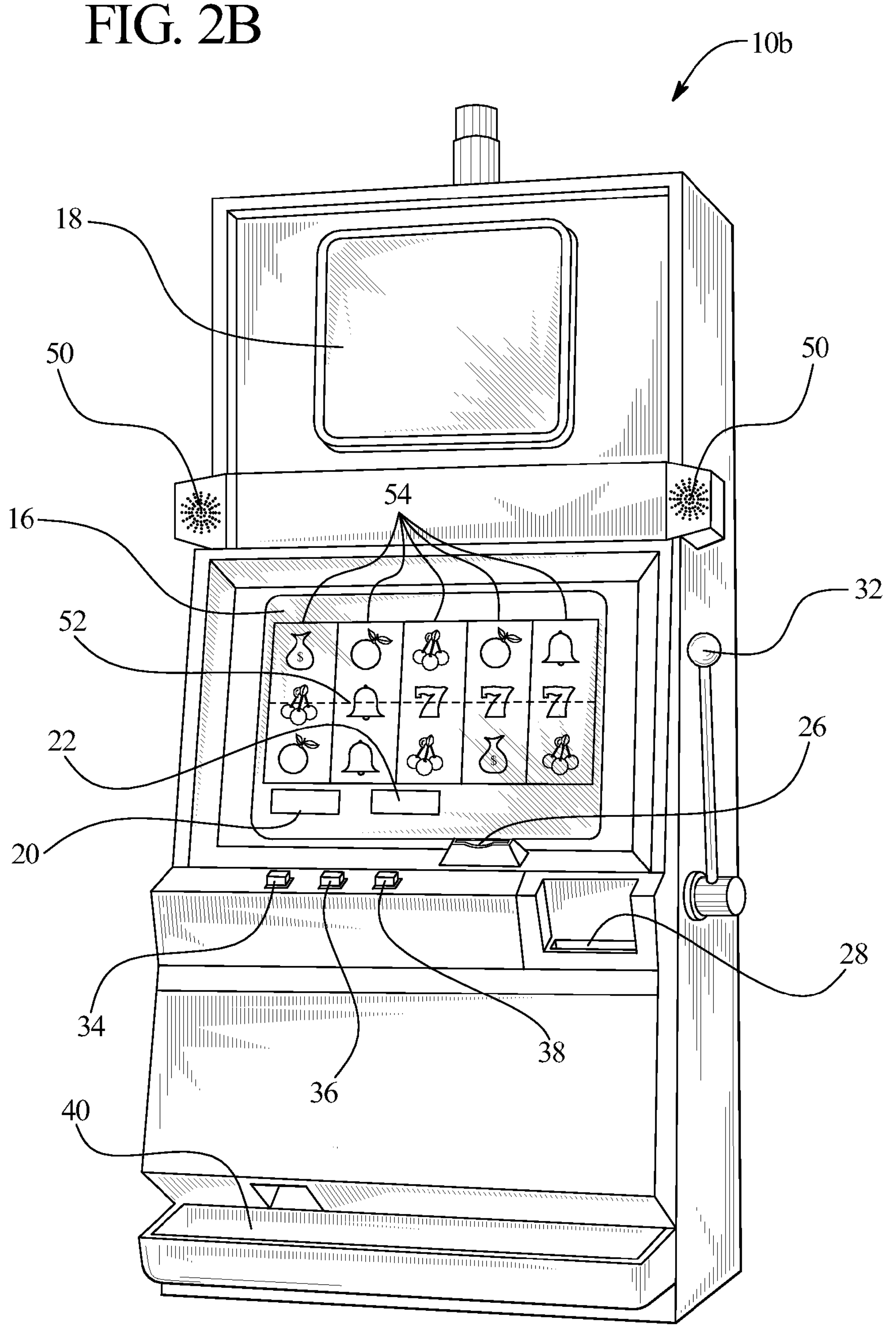

Two example alternative embodiments of the gaming device of the disclosed herein are illustrated in FIGS. 2A and 2B as gaming device 14*a* and gaming device 14*b*, respectively. Gaming device 14*a* and/or gaming device 10*b* are generally referred to herein as gaming device 14.

Figure 3:
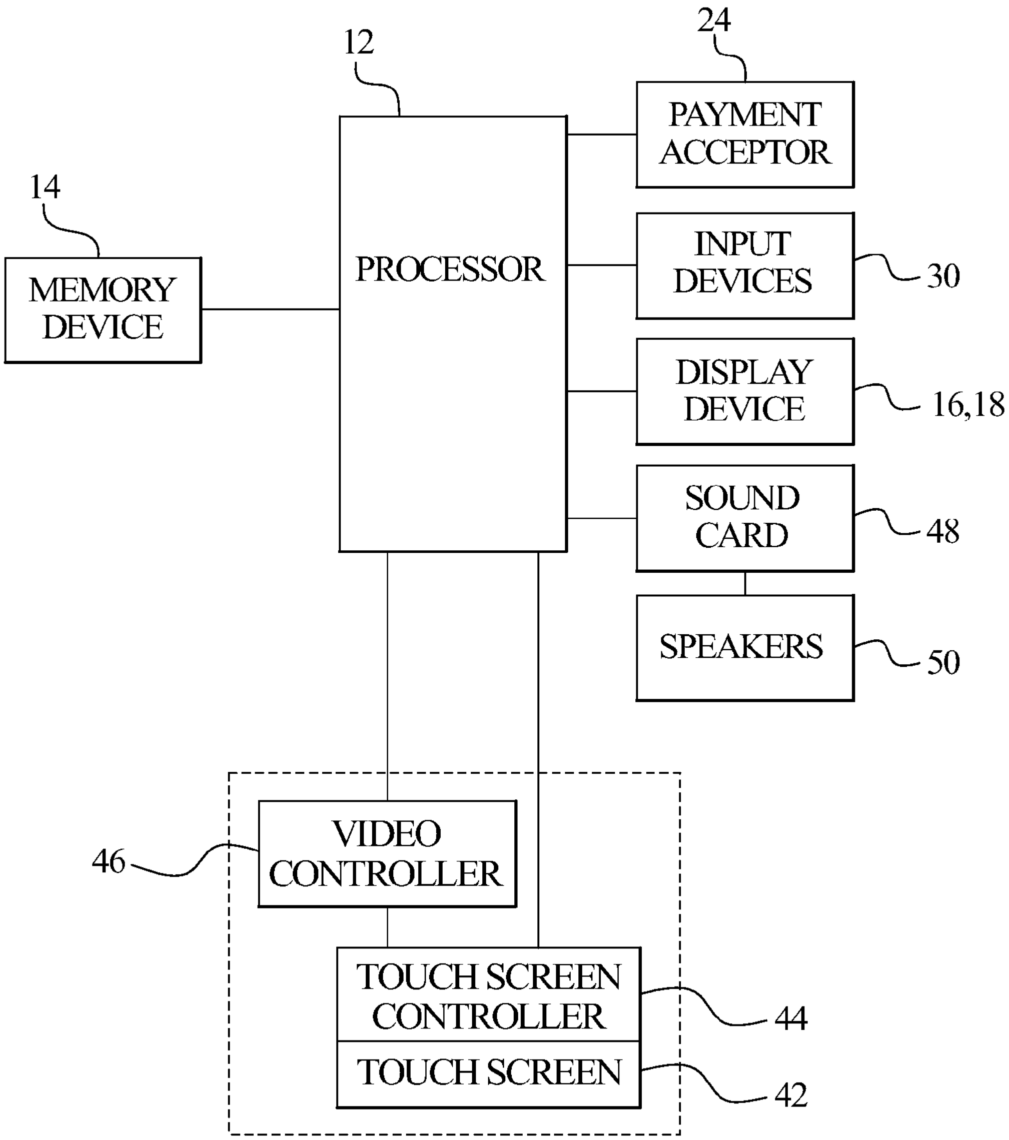
FIG. 3 is a schematic block diagram of the electronic configuration of one embodiment of a gaming device disclosed herein.

In the embodiments illustrated in FIGS. 3 and 2B, gaming device 14 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 2A and 2B, the gaming device may have varying cabinet and display configurations.

In one embodiment, as illustrated in FIG. 3, the gaming device preferably includes at least one processor 56, such as a microprocessor, a microcontroller-based platform, a suitable integrated circuit or one or more application-specific integrated circuits (ASIC's). The processor is in communication with or operable to access or to exchange signals with at least one data storage or memory device 58. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that he processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 3, the gaming device includes one or more display devices controlled by the processor. The display devices are preferably connected to or mounted to the cabinet of the gaming device. The embodiment shown in FIG. 2A includes a central display device 16 which displays a primary game. This display device may also display any suitable secondary game associated with the primary game as well as information relating to the primary or secondary game. The alternative embodiment shown in FIG. 2B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 2A and 2B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle. In another embodiment, at least one display device may be a mobile display device, such as a PDA or tablet PC, that enables play of at least a portion of the primary or secondary game at a location remote from the gaming device.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 3, in one embodiment, the gaming device includes at least one payment acceptor 24 in communication with the processor. As seen in FIGS. 2A and 2B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 2A, 2B and 3, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 2A and 2B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 3, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 3, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 14 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 2A and 2B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols 60, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 2A and 2B. In other embodiments, the triggering event or qualifying condition may be by exceeding a certain amount of game play (such as number of games, number of credits, amount of time), or reaching a specified number of points earned during game play.

In another embodiment, the gaming device processor 56 or central server 12 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

In one embodiment, as mentioned above, one or more of the gaming devices 14 are in communication with each other and/or at least one central server, central controller or remote host 12 through a data network or remote communication link. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions. In another embodiment, the central server is operable to access paytable information for one, more or each of the gaming devices in the gaming system for accounting and auditing purposes only.

In one embodiment, the central server or controller maintains or keeps track of the play and/or other activity on or relating to the gaming machines in the gaming system. In one embodiment, the central server keeps track of the play on each gaming machine including at least: (1) the amount wagered by the player(s) for each play of the primary game for each gaming machine (i.e., a total or partial coin-in or wager meter which tracks the total or partial coin-in wagers placed on all of the primary games for all of the gaming machines in the gaming system); and (2) the time the wagers are placed or the amount of time between each play of the primary game for each gaming machine. In another embodiment, each gaming device includes a separate coin-in, wager meter or pool which tracks the total or partial coin-in or wagers placed at that gaming device. It should be appreciated that the player of a gaming machine may change during this tracking and that this tracking can be independent of the specific player playing the gaming machine. It should be further appreciated that the wagers placed are tracked in any suitable compatible or comparable manner such as credits wagered (i.e., if all of the system gaming machines are of the same denomination) or monetary units (e.g., total dollars or other currency) wagered. It should be further appreciated that tracking in monetary units accounts for gaming machines having multi-denominations and/or for gaming machines of different denominations and/or gaming machines which accept different currencies.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In these embodiments, the player tracking system and/or central controller timely tracks when a player inserts their playing tracking card (i.e., Card In) to begin game play. The player tracking system and/or central controller also timely tracks when a player removes their player tracking card (i.e., Card Out) to conclude game play.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Enhanced Wagering Opportunities

In various embodiments, the central server and/or the individual gaming device determine to provide one of the players at one of the gaming devices in the gaming system an enhanced wagering opportunity.

In one embodiment, the central server determines when to provide an enhanced wagering opportunity and which player to provide such enhanced wagering opportunity to based on applicable player tracking information. In one such embodiment, the central server utilizes information or data maintained by the player tracking system to ascertain betting history of each player. In this embodiment, the player tracking system (or alternatively a player tracking module associated with the central server) communicates such information or data to the central server and the central server determines which player(s), if any, to provide the enhanced wagering opportunity to based on such information.

In one such embodiment, after a player inserts their player tracking card and the gaming system identifies the player, the gaming system determines whether to provide the player one or more enhanced wagering opportunities. In this embodiment, when the gaming system initially identifies a player, the gaming system determines whether it will offer the player an enhanced wagering opportunity, if necessary or appropriate, to supplement one or more of the player's subsequent wagers. That is, the gaming system determines whether to provide the player at least one enhanced wagering opportunity based on the player's identity and independent of any aspects of the player's subsequent gaming activity. In another such embodiment, the determination of whether to provide at least one enhanced wagering opportunity to a player is based on suitable player tracking information associated with an identified player and one or more aspects of any games played in a gaming session. In this embodiment, if a player is at or above a designated player tracking status and the central server determines that the player has played for a certain amount of time, wagered a certain amount of credits and/or has a certain amount of credits remaining for a designated gaming session, the central server provides the player at least one enhanced wagering opportunity. In another embodiment, the decision is made based on the gaming session itself independent of the player's status.

In another embodiment, the central server (or individual gaming device) enables a player to play as normal and recognizes when the player meets a designated threshold to be eligible for at least one enhanced wagering opportunity. In this embodiment, upon the player meeting the designated threshold, such as the player accumulating a designated number of player tracking points, the central server (or individual gaming device) provides the player at least one enhanced wagering opportunity.

It should be appreciated that in these embodiments, since a player's player tracking points or status may be associated with the player's wager and/or amount of time spent at a gaming establishment, players who consistently bet high and spend substantial amounts of time and/or money at a gaming establishment may be more likely to be eligible to win or receive an enhanced wagering opportunity than a player who has little or no recorded history with the gaming establishment (i.e., a player with little or no tracked information). In another embodiment, if the player's number of player tracking points (determined via a player tracking system) is not enough for the player to win an enhanced wagering opportunity, the central server enables the player to purchase a suitable amount of player tracking points such that the player's player tracking account is associated with enough player tracking points to provide the player an enhanced wagering opportunity.

In one embodiment, the central server utilizes player tracking information and tracked wagering activity to determine when to provide at least one enhanced wagering opportunity and to which player to provide such enhanced wagering opportunity. In one such embodiment, for each player playing a gaming device in the gaming system, the central server determines whether to provide that player an enhanced wagering opportunity, wherein the determination is based, at least in part, on that player's player tracking status and that player's wagering activity. In this embodiment, upon the player meeting a designated threshold, such as a player of a defined player tracking status placing a defined amount of wagers, the central server provides the player an enhanced wagering opportunity. In one such embodiment, players of different player tracking statuses must wager different amounts to be eligible to win any enhanced wagering opportunities. For example, a bronze level player must wager a first amount to win any enhanced wagering opportunities and a gold level player must wager a second, different amount to win any enhanced wagering opportunities. In another such embodiment, players of different player tracking status who wager the same amount are provided different enhanced wagering opportunities.

In one embodiment, the central server utilizes player tracking information associated with a plurality of players and picks one of these players to provide an enhanced wagering opportunity. In this embodiment, the gaming device selects one of these players to provide an enhanced wagering opportunity, wherein the probability of the central server selecting each player is based on that player's player tracking or player loyalty information. For example, the central server might rate the players as follows: (1) Player A with a player tracking card with a long history of high bets, (2) Player B with a player tracking card with a long history of average bets, (3) Player C with no player tracking card currently wagering high on a gaming machine for a specified period of time, (4) Player D with a player tracking card with a history of low bets, (5) Player E with no player tracking card currently wagering average bets, and (6) Player F with no player tracking card currently wagering low bets. In this example, Player A would be more likely to receive an enhanced wagering opportunity than Player F; however, in this example, each of the players are still eligible to receive one of the enhanced wagering opportunities. It should be appreciated that just because the player tracking system does not maintain information about a player (i.e., the player does not have a tracking card), the player could still obtain a higher likelihood of receiving one of the enhanced wagering opportunities by wagering high bet amounts. In one such embodiment, upon providing an uncarded player an enhanced wagering opportunity, the gaming system prompts the player to join the player tracking club to obtain the enhanced wagering opportunity.

In another such embodiment, the determination of which player(s), if any, to provide an enhanced wagering opportunity to is based on the player's status (determined via a player tracking system). In another embodiment, certain enhanced wagering opportunities may be offered to certain players, such as gold or platinum club players, and not offered to other players. In another embodiment, certain enhanced wagering opportunities may be tailored such that a gold player may receive higher benefits from an enhanced wagering opportunity than a bronze player. Accordingly, the central server is adapted to target specific players or groups of players based on each player's gaming activity, such as each player's amount wagered, time played, games won or player tracking status.

It should be appreciated that by utilizing such a player tracking system, the central server does not provide an enhanced wagering opportunity to an empty or un-carded gaming device. In this embodiment, a card-in event starts the tracking of a player's gaming activity for enhanced wagering opportunity determinations. Thus, the carding of the player ensures the person who actually "wins" the enhanced wagering opportunity is provided the enhanced wagering opportunity because such an enhanced wagering opportunity is associated with the player tracking card and not the gaming machine. In another embodiment, the tracking of gaming activity for enhanced wagering opportunity determinations starts when the gaming machine is activated. In this instance, the central controller knows only that the gaming machine is being wagered on and keeps track of these wagers. If the gaming machine is chosen as the winner of an enhanced wagering opportunity, the central controller provides that enhanced wagering opportunity to the gaming machine (and not necessarily to the player who may have been responsible for the gaming activity recorded from that gaming machine).

In another embodiment, in determining whether to provide a player an enhanced wagering opportunity, the central server determines if enough coin-in has been collected by the gaming system to provide an enhanced wagering opportunity. In this embodiment, an enhanced wagering opportunity coin-in pool must be sufficiently funded or funded to a designated level to enable the central sever to provide one or more enhanced wagering opportunities. In one embodiment, upon the central server's determination that the coin-in pool is sufficiently funded to provide one or more enhanced wagering opportunities, the central server provides one or more enhanced wagering opportunities on at least one selected gaming device. In another embodiment, as opposed to automatically providing one or more enhanced wagering opportunities, after the coin-in pool is sufficiently funded, the central server randomly determines whether to provide one or more enhanced wagering opportunities. In one such embodiment, after enough coin-in has been collected, the central server determines, at designated intervals, whether to provide one or more enhanced wagering opportunities. In different embodiments, the designated intervals are based on monetary units wagered or based on time elapsed.

In another embodiment, the central server utilizes a true time based model to determine whether to provide a player an enhanced wagering opportunity. In this embodiment, the enhanced wagering opportunities are funded by a pool that is built up and subsequently depleted as each enhanced wagering opportunity is provided to a player. In another embodiment, the central server utilizes a reverse pool to determine whether to provide a player an enhanced wagering opportunity. In this embodiment, the central server fills or funds a reverse pool after one or more enhanced wagering opportunities actually occur. In one such embodiment, the central server builds and depletes the reverse pool between enhanced wagering opportunities. In another embodiment, the reverse pool includes a designated quantity of monetary units to start with (as opposed to always refilling from 0 monetary units). This situation occurs if the reverse pool is required to carry at least a certain amount of monetary units or if an enhanced wagering opportunity is not immediately provided when the reverse pool parameters are met.

In another embodiment, the central server utilizes predictive modeling to determine whether to provide a player an enhanced wagering opportunity. The central server accounts for the number of gaming devices that are being actively played, the wager amounts or bets being made at each gaming device, and how much is expected to be provided at each actively played gaming device. The central server uses this information to determine when to provide a player an enhanced wagering opportunity. In one embodiment, the central server uses one or more pools to cover the enhanced wagering opportunity, wherein the central server adjusts the pool as needed. In another embodiment, each player has their own separate pool which is based on a percentage of their play. In this embodiment, when a player's personal pool reaches a predetermined amount or threshold, the player is provided with an enhanced wagering opportunity based on the amount associated with their personal pool.

In an alternative embodiment, the gaming system enables the player to determine, at least in part, if they will be provided an enhanced wagering opportunity. In this embodiment, independent of the central server, at least one determination occurs pertaining to if the player will be provided an enhanced wagering opportunity. In one such embodiment, based on at least one event which occurs in associated with a gaming device service window or a player tracking device, a determination occurs regarding if the player will be provided an enhanced wagering opportunity.

In different embodiments, the central server's determination to provide at least one of the players an enhanced wagering opportunity is predetermined, determined based on one or more game play events, such as a symbol-driven trigger, determined based on a random determination by the central server, determined based on a random determination at one of the gaming devices, determined based on one or more side wagers placed, determined based on a player's primary game wager or determined based on any other suitable method or criteria. In different embodiments, the central server determines to provide an enhanced wagering opportunity if one or more players exceed a certain amount of game play (such as number of games, number of credits, or amount of time), or reaching a specified number of points earned during game play. In one such embodiment, the gaming device does not provide any apparent reasons to the player for providing an enhanced wagering opportunity. In this embodiment, providing an enhanced wagering opportunity is not triggered by an event in or based specifically on any of the plays of any primary game. That is, the gaming device may simply qualify a player to be provided an enhanced wagering opportunity without any explanation or alternatively with simple explanations.

If the gaming system determines to provide at least one enhanced wagering opportunity to the player, the central server (or individual gaming device) determines the type of enhanced wagering opportunity to provide to the player.

In one embodiment, the type of enhanced wagering opportunity is based on the player's status (such as determined through a player tracking system). In one such embodiment, the central server determines different types of enhanced wagering opportunities to offer to different players of different player status levels who are wagering the same amount. For example, the central server determines a first enhanced wagering opportunity to provide to a first player (of a first player status level) wagering a first amount and a second type of enhanced wagering opportunity to provide to a second player (of a second, greater player status level) also wagering the first amount.

In another embodiment, the type of enhanced wagering opportunity is based on the player's status (such as determined through a player tracking system) and one or more aspects of the player's gaming activity. For example, if the gaming device's credit meter is near zero credits, the gaming system may determine to enable the player to continue playing one or more games even if the credit meter falls below zero. On the other hand, if the gaming device's credit meter is significantly above zero credits (wherein the previous enhanced wagering opportunity is of less concern to a player), the gaming system may enable the player to play a set number of games at the maximum wager amount wherein the costs of the set number of games is greater than the amount currently in the gaming device's credit meter. For example, if the maximum wager amount is 5 credits and 50 credits are in the player's credit meter, the gaming device can implement the negative credit meter feature by enabling the player to designate that they want to play 20 games at the maximum wager. If the player loses at every game, the credit meter will be at negative 50 credits.

In another embodiment, the type of enhanced wagering opportunity provided to the player is based on a set of pre-defined rules and/or information associated with the identified player. In this embodiment, based on the player's status (obtained via a player tracking status), the player's gaming activity, and/or one or more gaming system determinations, the gaming system determines the type(s) of enhanced wagering opportunities to provide to the player. In different embodiments, the type of enhanced wagering opportunity to offer to a player is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, upon determining to provide the player an enhanced wagering opportunity and determining the type of enhanced wagering opportunity, the gaming device displays to the player a player service panel to indicate to the player the determined enhanced wagering opportunity. In different embodiments, the gaming system utilizes one or more of the following to inform the player regarding the determined enhanced wagering opportunity: a text displayed to the player, an audio or audiovisual message, an animated Avatar message, a message delivered through a casino host, or in any other suitable manner.

In one embodiment, one of the types of enhanced wagering opportunities to provide to a player is selectively enabling the player to continue playing one or more wagering games at the maximum wager level, even though the gaming device's credit meter is at or below zero credits. In one embodiment, if the gaming device's credit meter is at or below zero credits, the gaming system supplements one or more of the player's subsequent wagers. That is, if the maximum bet amount is X (which is required for the player to obtain the maximum possible payback) and the gaming device's credit meter only includes Y credits, the gaming system enables the player to play one or more subsequent wagering games with the maximum bet placed on each subsequent wagering game, even if the gaming device's credit meter falls below zero credits.

Figure 4A:
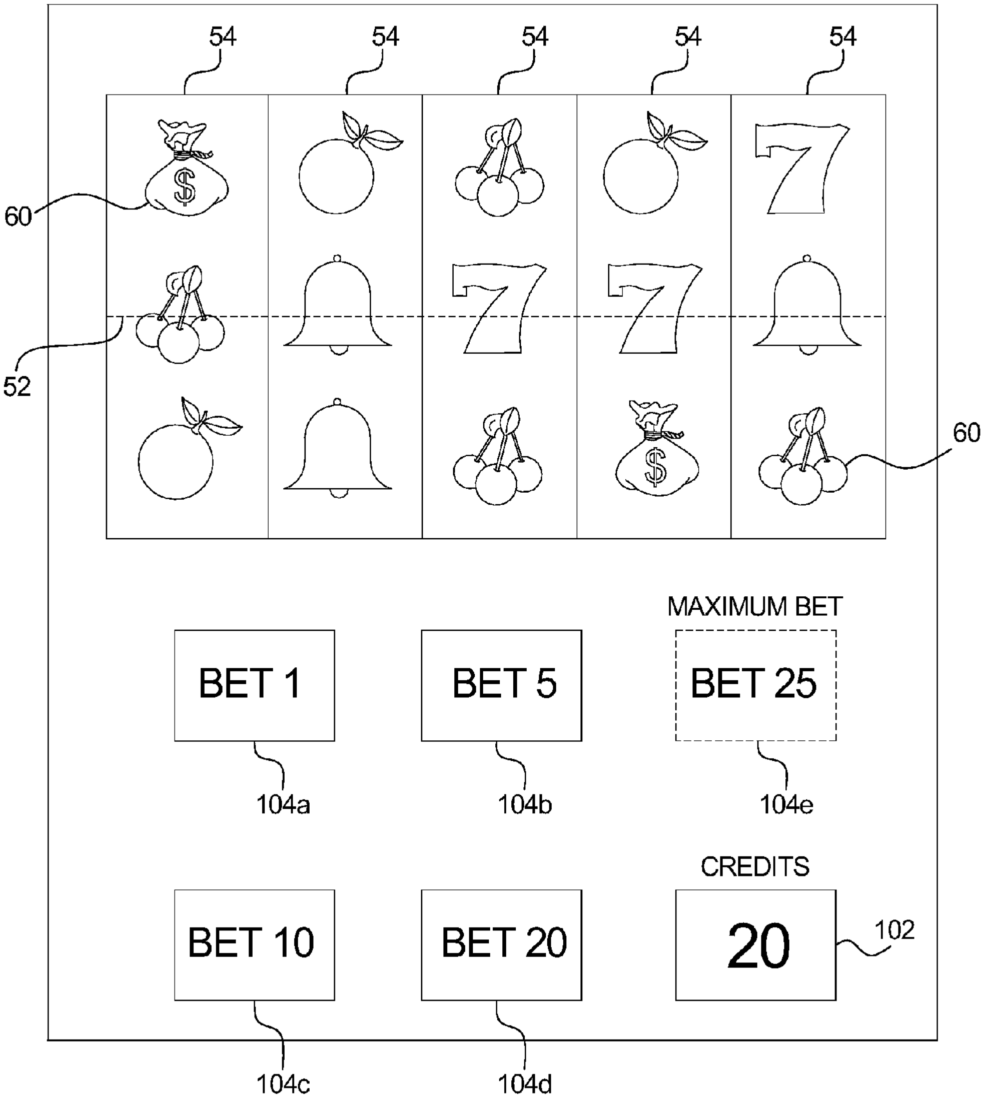
FIGS. 4A, 4B, 4C, 4D, 4E, 4F and 4G are front-side views of one embodiment of the gaming device display disclosed herein illustrating an enhanced wagering opportunity provided to a player.
Figure 4B:
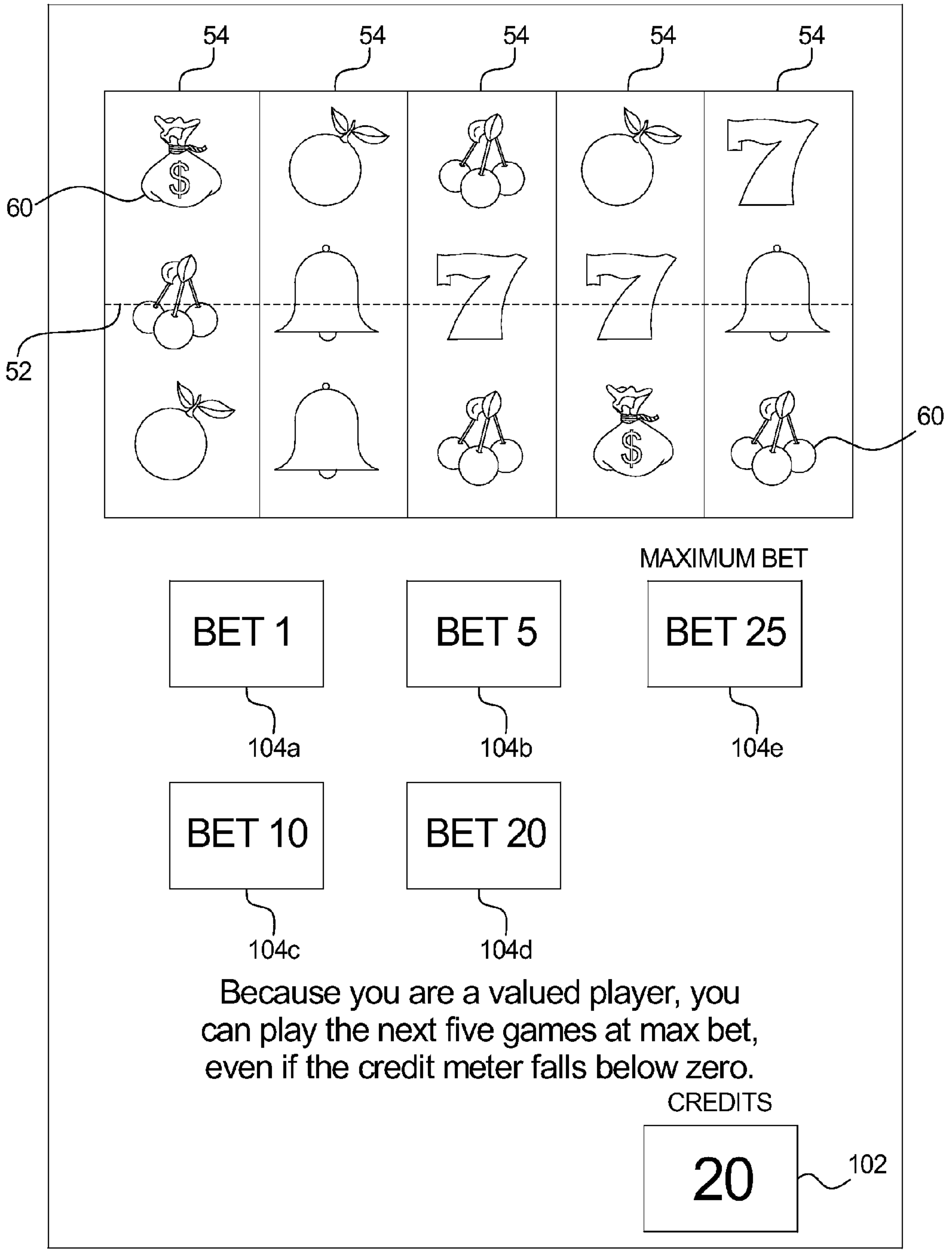

For example, as illustrated in FIG. 4A, if the gaming device's credit meter currently includes twenty credits 102 and the maximum bet (to utilize the paytable with the highest average expected payout) is twenty-five credits, the player is unable to place the maximum bet (as indicated by the maximum bet button 104*c* shown in phantom) to receive the benefit of the paytable associated with the highest average expected payout. In this example, if the gaming system determines to provide the player an enhanced wagering opportunity by enabling the player to continue playing one or more wagering games even though the gaming device's credit meter is at or below zero credits, then as illustrated in FIG. 4B, the gaming device enables the player to place the maximum bet (as indicated by the maximum bet button 104*c* shown in solid) to receive the benefit of the paytable associated with the highest average expected payout. Appropriate messages such as "BECAUSE YOU ARE A VALUED PLAYER, YOU CAN PLAY THE NEXT FIVE GAME AT MAX BET, EVEN IF THE CREDIT METER DROPS BELOW ZERO" are provided to the player visually, or through suitable audio or audiovisual displays.

Figure 4C:
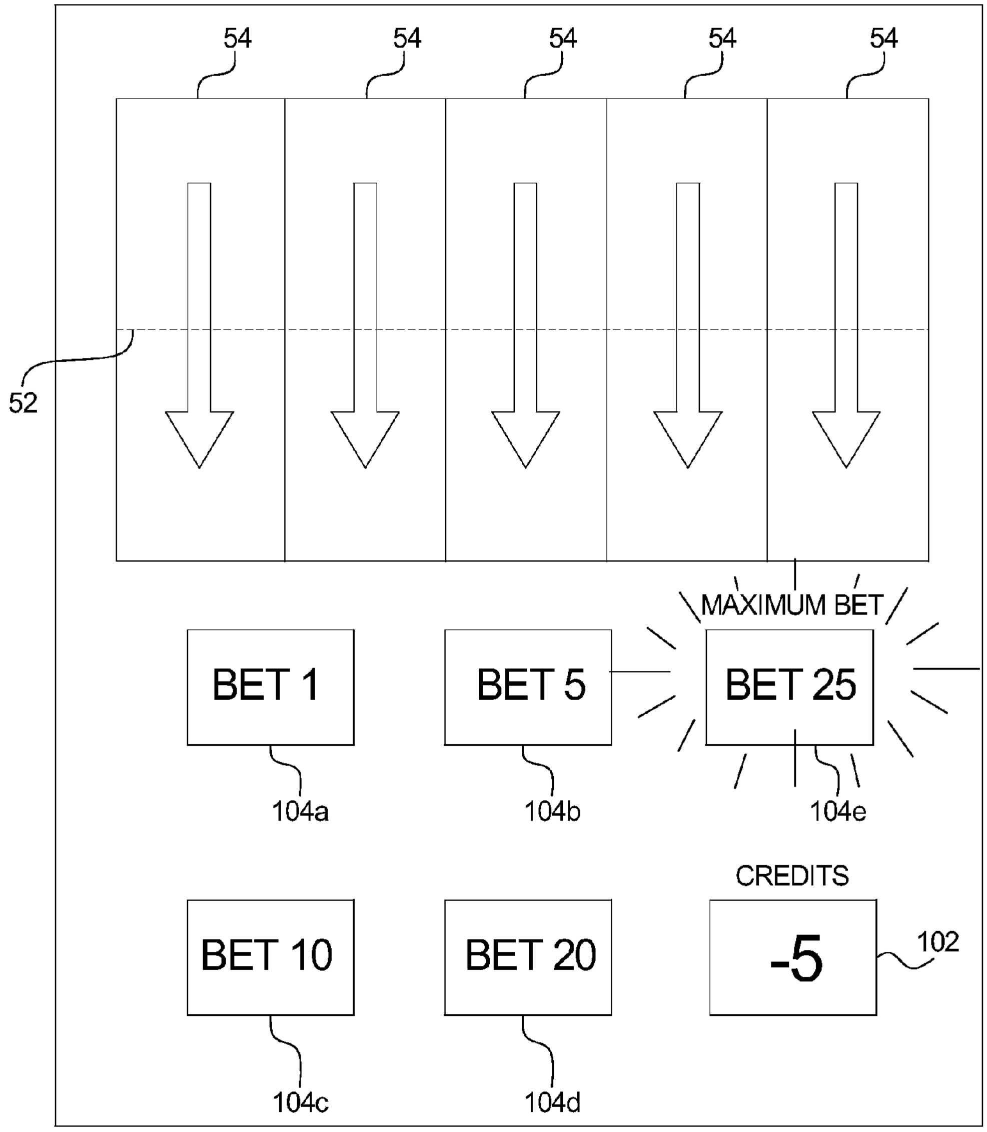
Figure 4D:
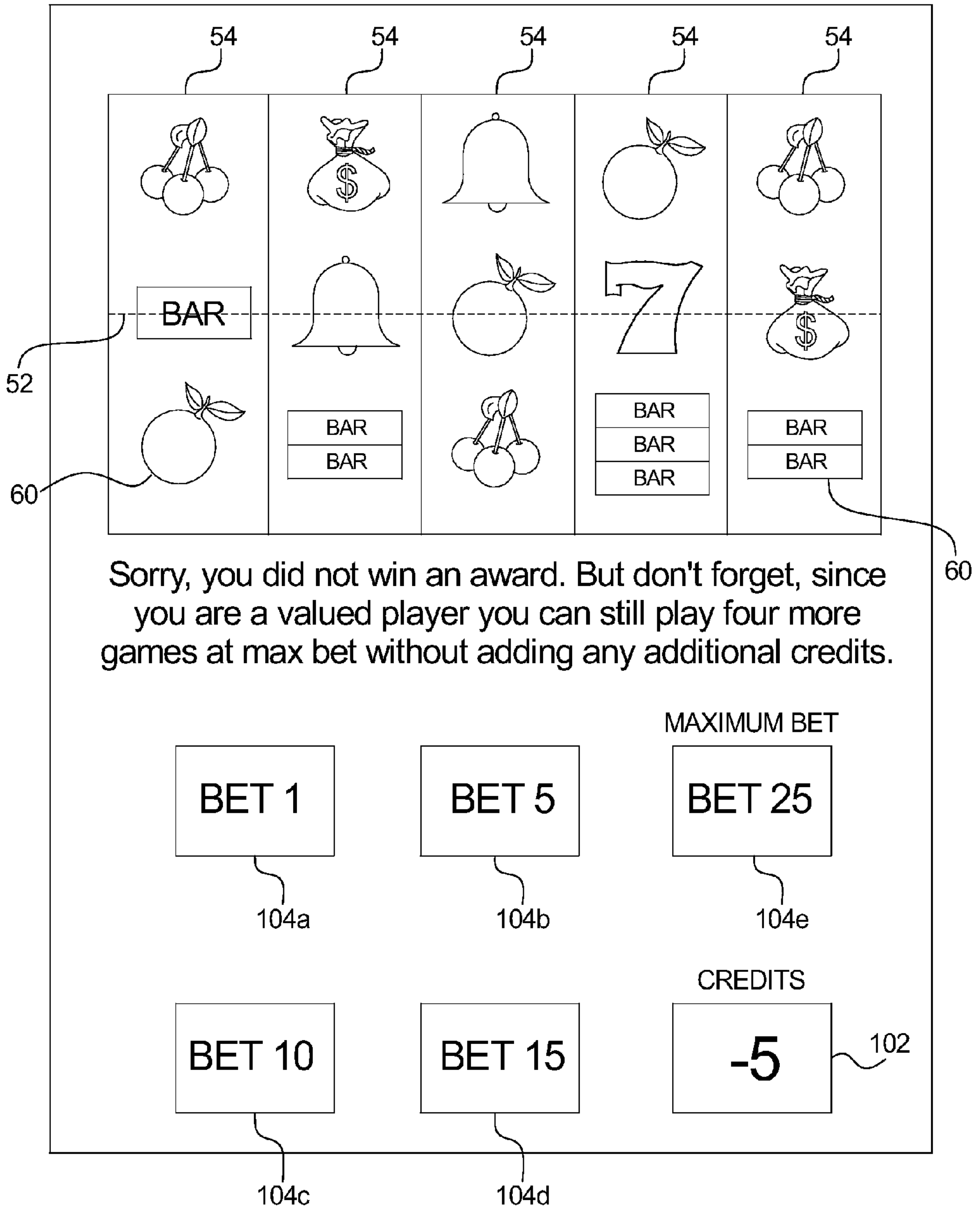

As illustrated in FIG. 4C, the player places the maximum bet, the reels are activated and the gaming device's credit meter 102 falls below zero to negative five credits. As seen in FIG. 4D, the reels generate a symbol combination and the gaming device determines if the generated symbol combination is associated with an award. In this case, the generated symbol combination is not associated with an award. Appropriate messages such as "SORRY, YOU DID NOT WIN AN AWARD" and "BUT DON'T FORGET, SINCE YOU ARE A VALUED PLAYER, YOU CAN STILL PLAY FOUR MORE GAMES AT MAX BET WITHOUT ADDING ANY ADDITIONAL CREDITS" are provided to the player visually, or through suitable audio or audiovisual displays.

Figure 4E:
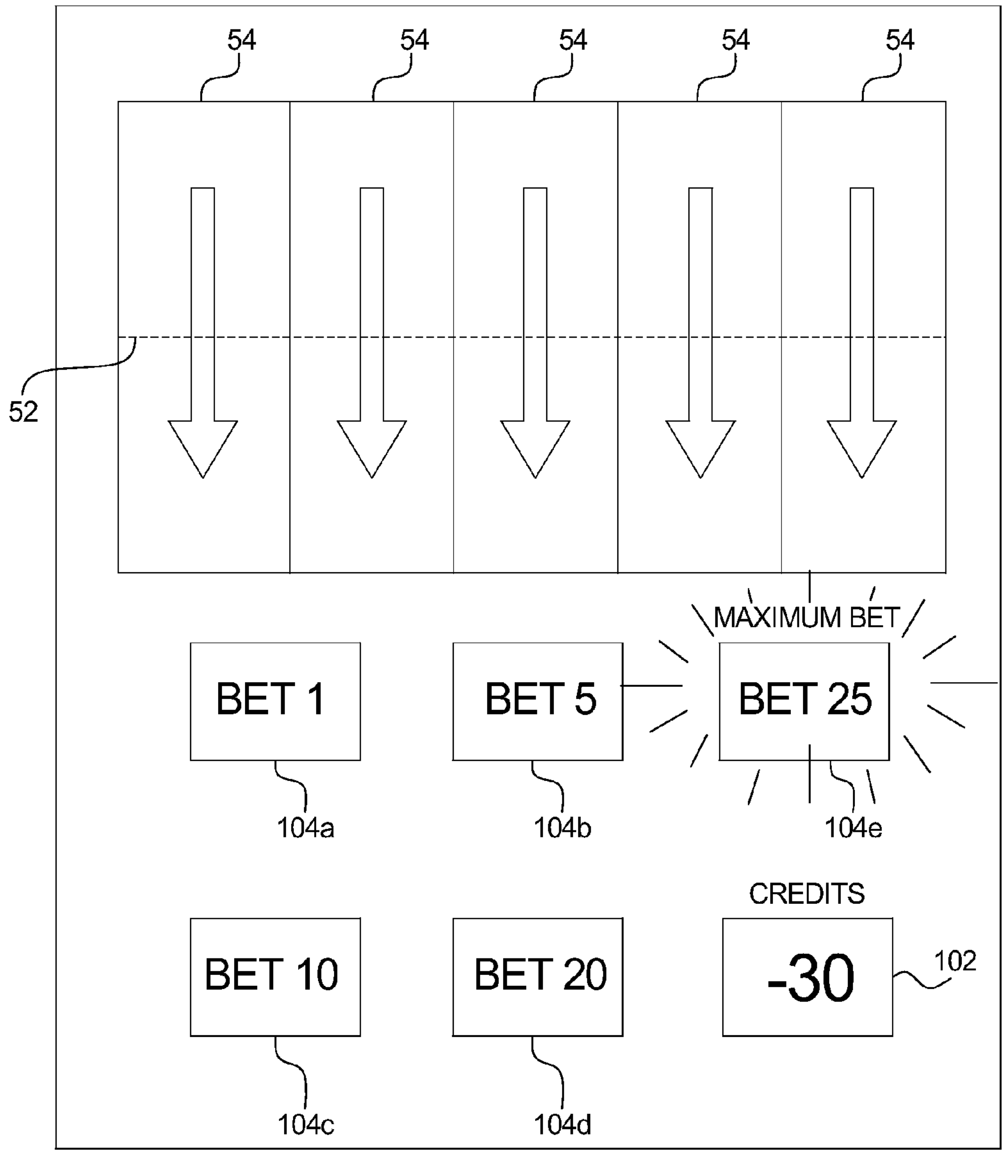

After providing any award to the player, the gaming device determines if the player is enabled to place another maximum wager even though the credit meter is currently below zero. In this example, as the player is enabled to place a limit of four more maximum wagers (even though the credit meter is currently below zero), as seen in FIG. 4E, the player places the maximum bet, the reels are activated and the gaming device's credit meter 102 falls further below zero to negative thirty credits. In this example, the reels generate a symbol combination which is not associated with an award, the gaming device determines that that the player is enabled to place a limit of three more maximum wagers.

Figure 4F:
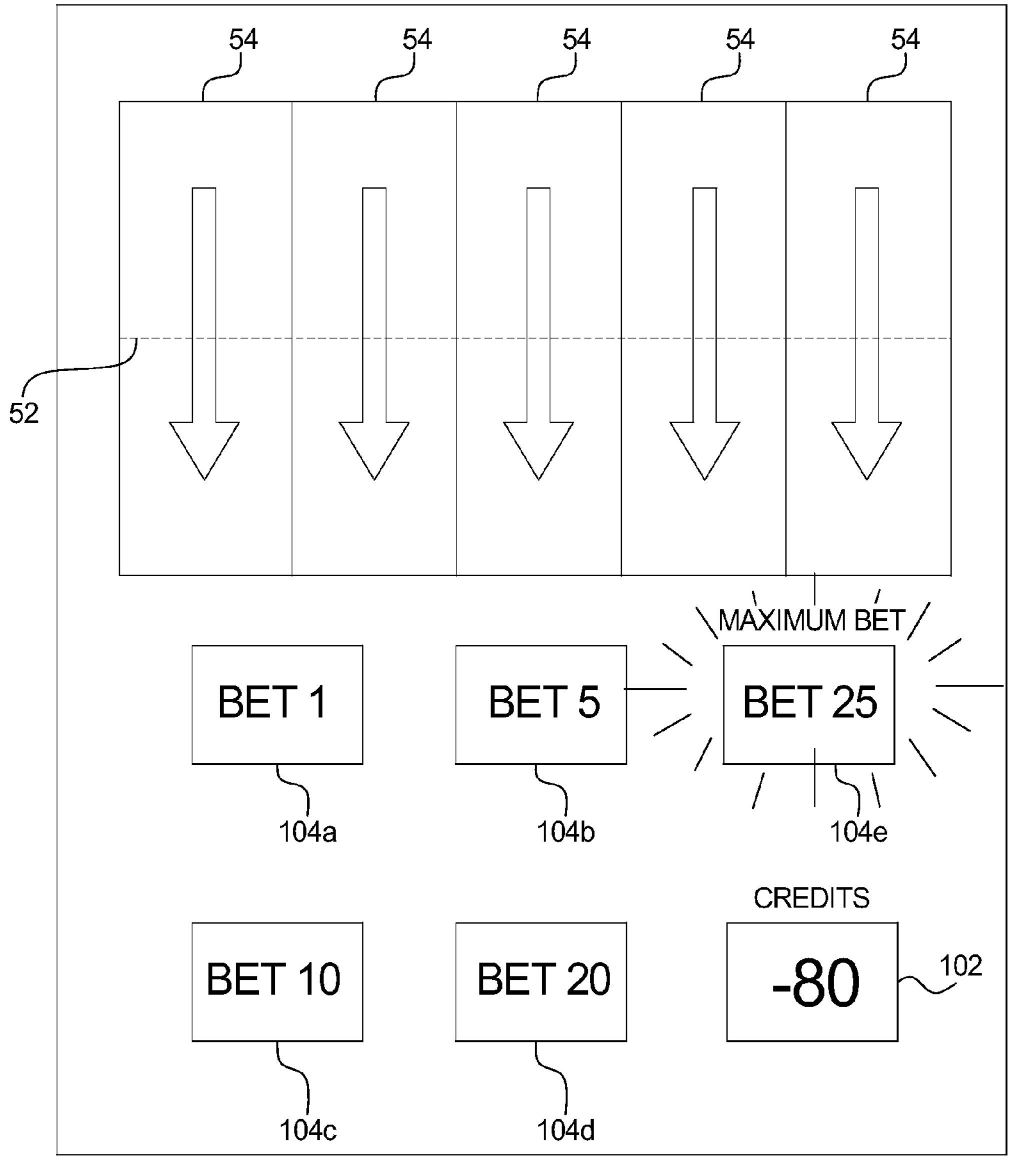
Figure 4G:
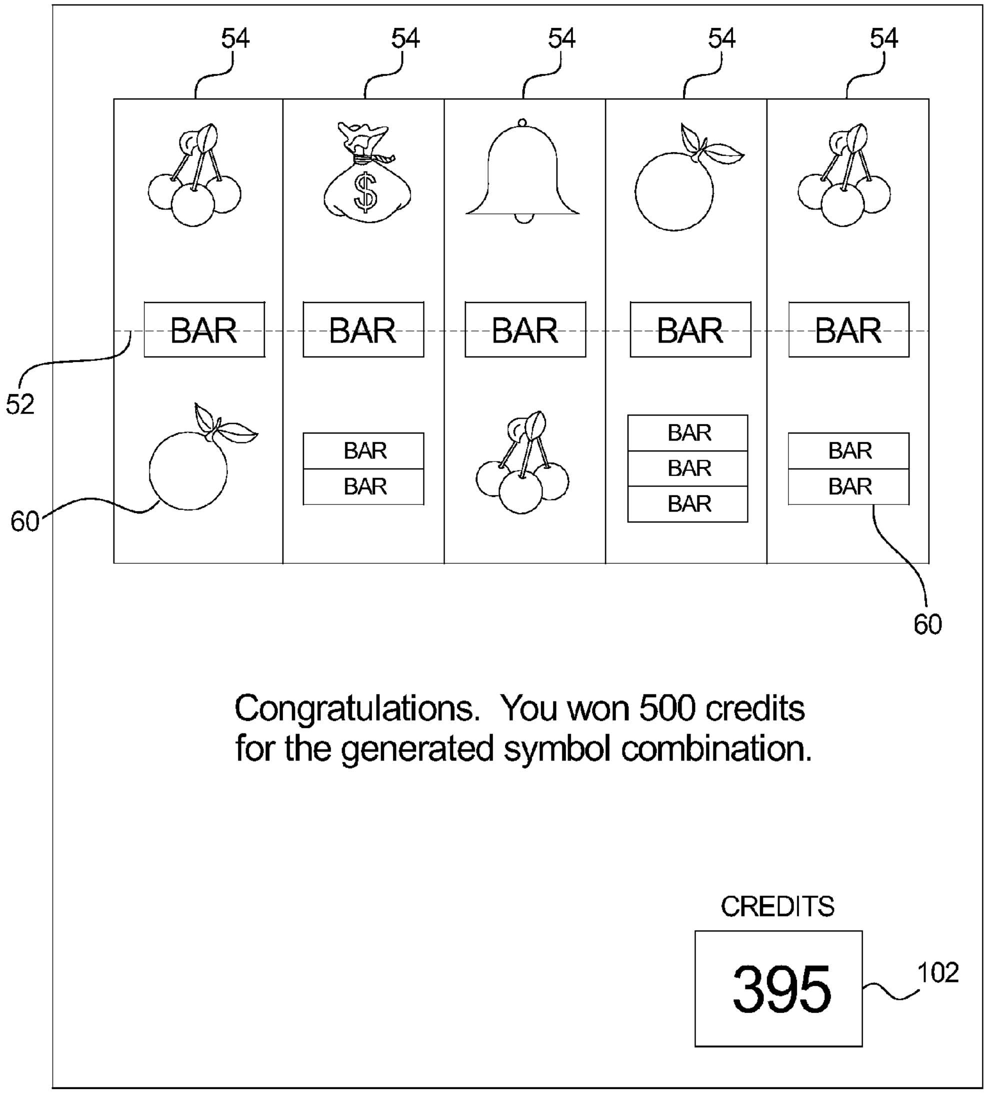

After playing two more games at the maximum wager level (not shown), the gaming device's credit meter is negative 80 and, as seen in FIG. 4F, the gaming device enables the player to play one more game at the maximum wager level (even though the credit meter is currently below zero) to bring the negative credit meter to negative 105. As seen in FIG. 4G, the reels generate a winning symbol combination and the award of five-hundred credits associated with the winning symbol combination is provided to the player. The gaming device's credit meter is incremented above zero again to 395 credits. Appropriate messages such as "CONGRATULATIONS" and "YOU WON 500 CREDITS FOR THE GENERATED SYMBOL COMBINATION" are provided to the player visually, or through suitable audio or audiovisual displays. Accordingly, such a configuration enables the player to play at a maximum bet to optimize the potential pay-out (i.e., utilize a paytable associated with the highest average expected payout) of the gaming device.

It should be appreciated that had the gaming system not enabled the player to place a number of maximum wagers even though the gaming device's credit meter was below zero, the player may not have placed a suitable wager to win the award as seen in FIG. 4G. That is, if an approved player is at a gaming device in the gaming system and they run out of credits, the gaming device enables the player to keep playing when they otherwise may had to leave. Such a configuration enables the player to subsequently win one or more awards to bring the credit meter back to above zero (and thus enable the player to continue to play).

In one embodiment, the gaming system determines to enable the gaming device's credit meter to fall below zero for one subsequent wagering game. In another embodiment, the gaming system determines to enable the gaming device's credit meter to fall below zero for a plurality of subsequent wagering games. In these embodiment, if the player plays a designated number subsequent wagering games with a negative credit meter (i.e., if a negative credit meter threshold is reached), the player must either cover the credit meter to continue to play or stop playing the gaming device.

In another embodiment, the gaming system determines to enable the gaming device's credit meter to fall a designated amount below zero. In this embodiment, if the gaming device's credit meter falls to the designated amount below zero (i.e., if a negative credit meter threshold is reached), the player must either cover the credit meter to continue to play or stop playing the gaming device.

In another embodiment, the gaming system determines to enable the gaming device's credit meter to remain below zero for a designed amount of time. In this embodiment, if the gaming device's credit meter falls below zero for the designated period of time (i.e., if a negative credit meter threshold is reached), the player must either cover the credit meter to continue to play or stop playing the gaming device.

In one such embodiment, if the gaming device's credit meter is still below zero credits after playing one or more subsequent wagering games, the gaming system utilizes the player's player tracking account to cover any amount of credits the gaming device's credit meter is below zero or negative. That is, an amount of player associated promotional credits or player tracking points equivalent or substantially equivalent to the amount the gaming device's credit meter is negative are deducted from the player's player tracking account and utilized to cover the play of one or more additional games at the maximum wager. For example (not shown), if following FIG. 4F, a winning symbol combination was not generated following the gaming device's credit meter falling below zero (or a winning symbol combination associated with an award less than the amount the gaming device's credit meter is below zero), then any amount which the credit meter is below zero is covered via the player's player tracking account.

In another embodiment, if the gaming device's credit meter is still below zero credits after playing one or more subsequent wagering games, the gaming system enables certain players (i.e., players of a designated player status level) to cover, at a later time, the amount the gaming device's credit meter is below zero. In this embodiment, the player may cover the negative credit meter at a gaming device, at a kiosk, at a gaming establishment cashier, via a hotel account, via the internet or in any other suitable manner.

In another embodiment, any amount the credit meter is negative after the player stops playing is covered by one or more enhanced wagering opportunity pools. In this embodiment, as described above, the central server allocates a certain percentage of each wager placed to an enhanced wagering opportunity pool, where any amount the credit meter is negative after the player stops playing is covered from the wagers or coins-in allocated to the enhanced wagering opportunity pool. In another embodiment, any amount the credit meter is negative after the player stops playing is covered, at least in part, via an amount provided by one or more marketing and/or advertising departments, such as a gaming establishment's marketing department. Such coverage provides that the enhanced wagering opportunities do not take away from the gaming payouts of any gaming devices. It should be appreciated that any suitable manner of covering this feature may be implemented in accordance with the gaming system disclosed herein.

In another embodiment, one of the types of enhanced wagering opportunities to provide to a player is selectively enabling the player to place the maximum wager for at least one game, even if the gaming device's credit meter is currently less than the amount required to place the maximum wager. In this embodiment, if the maximum bet amount is X (which is required for the player to obtain the maximum possible payback) and the gaming device's credit meter only includes Y credits, to optimize the potential payout of the game, the gaming system offers the player the difference between X and Y such that the player is still enabled to play one or more subsequent wagering games with the maximum bet placed on each subsequent wagering game. For example, if the maximum bet for a gaming device is 45 credits (which would utilize the paytable with the highest average expected payout for that gaming device) and the gaming device's credit meter currently has 30 credits, the gaming system offers to subsidize the player the 15 credits necessary to enable the player to place the maximum bet on the next wagering game.

In one such embodiment, similar to the manner in which a negative credit meter is covered, the difference between the maximum wager amount and the amount currently in the gaming device's credit meter is covered from the player's player tracking account, from a subsequent payment by the player, from an enhanced wagering opportunity pool, from a gaming establishment marketing department or from any other suitable source.

In another embodiment, one of the types of enhanced wagering opportunities to provide to a player is enabling the player to continue playing one or more wagering games wherein part of any amount won is retained by the gaming system or gaming establishment. In this embodiment, if the maximum bet amount is X (which is required for the player to obtain the maximum possible payback) and the gaming device's credit meter only includes Y credits, to optimize the potential payout of the game, the gaming system enables the player to play one or more subsequent wagering games with the maximum bet placed on each subsequent wagering game wherein a portion of any amount won by the player is retained by the gaming system or the gaming establishment. For example, if a gaming system provides 10 of the 50 credits needed for the player to play a subsequent game with the maximum wager, the gaming system will retain 20% of the total win resulting from that subsequent game played.

In one alternative embodiment, the type of enhanced wagering opportunity provided to the player is upon a player inserting money into the gaming device, the gaming device enables the player to play one or more subsequent games at the maximum bet. That is, to provide the player the full benefits associated with placing the maximum wager amount, an enhanced wagering opportunity is offered to the player wherein if all of the player's subsequent games are played at the maximum bet, the player is guaranteed at least X games where X is greater than the amount of money deposited into the gaming device divided by the maximum bet per game played. It should be appreciated that in this embodiment, the gaming device enables the player to play the designed number of games at the maximum bet level even if the credit meter is required to go negative. Hence, the player is guaranteed to get more play out of the gaming machine than the money they put in. This embodiment provides that if the player goes through all of their money with no wins, the credit meter can go negative as needed and they are still provided more games. Accordingly, this embodiment does not require the player to fight back from a negative meter and provides no additional cost to the player, but provides, if necessary, a negative credit meter only to enable the player to have more games than they paid for. In this embodiment, if the credit meter is still negative at the end of the X games, the credit meter returns to zero.

In another embodiment, the enhanced wagering opportunity provided to the player is upon the gaming system determining that the player has not been playing at the maximum bet, enabling the player to play one or subsequent games at the maximum bet. That is, to provide the player the full benefits associated with placing the maximum wager amount, an enhanced wagering opportunity is offered to the player wherein if all of the player's subsequent games are played at the maximum bet, the player is guaranteed at least X games where X is greater than the amount of money deposited into the gaming device divided by the maximum bet per game played. It should be appreciated that in this embodiment, the gaming device enables the player to play the designed number of games at the maximum bet level even if the credit meter is required to go negative. Hence, the player is guaranteed to get more play out of the gaming machine than the money they put in. This embodiment provides that if the player goes through all of their money with no wins, the credit meter can go negative as needed and they are still provided more games. Accordingly, the gaming system does not require the player to start with a negative amount in the gaming device's credit meter and provides no additional cost to the player, but rather enables the gaming device's credit meter to dip below zero only if necessary (i.e., if the player goes through all of their money with no wins). In this embodiment, if the credit meter is still negative at the end of the X games, the credit meter returns to zero.

For example, upon inserting money into the gaming device (or alternatively upon the gaming system determining that the player is not placing the maximum bet) to play a $1 maximum bet game, the gaming device enables the player to play at least thirty games at the maximum bet for the set fee of $25 (i.e., five guaranteed additional plays). Accordingly, the player is guaranteed to get more play out of the gaming device than the money they put in. Appropriate messages such as "IF YOU PLAY EACH GAME AT THE MAXIMUM BET, YOU WILL GET AT LEAST 30 GAMES FOR YOUR $25, EVEN IF THE CREDIT METER GOES NEGATIVE" may be provided to the player visually, or through suitable audio or audiovisual displays.

In one embodiment, the gaming system offers one of these enhanced wagering opportunities to the player to utilize. In another embodiment, the gaming system offers a plurality of these enhanced wagering opportunities to the player, wherein the player selects which offer to utilize. In different embodiments, the number of enhanced wagering opportunities offered to the player are predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

As illustrated from the above-described embodiments, the gaming system and method disclosed herein is operable to recognize game players and use this information to prompt them to place the maximum bet amount by providing tailored offers based on the player information obtained. That is, the gaming system and method disclosed herein is operable to use this information to provide a player a "comp" in the form of letting the credit meter go negative to provide the player the maximum potential payout (i.e., providing the player the full benefits associated with placing the maximum wager amount) associated with the currently played gaming device.

In another embodiment, the credit meter is enabled to go negative based on a buy-in amount. In this embodiment, based on the initial amount of the credit meter (i.e., the amount the player initially deposited), the gaming device enables the credit meter to go negative, if necessary, during a designated number of subsequent games played. For example, if a player inserts $100 into a gaming device and plays until the credit meter reaches zero, based on the buy-in of $100, the gaming device enables the player to play a designated number of subsequent games wherein the player is enabled to continue playing with a negative credit meter for the designated number of subsequent games.

In different embodiments, the buy-in amount required to enable the credit meter to go negative can be determined by any suitable criteria as mentioned above. In different embodiments, the number of subsequent games the player is enabled to continue playing with a negative credit meter is determined by any suitable criteria as mentioned above.

In one such embodiment, different players of different player tracking statuses have different buy-in amounts required to enable the credit meter to go negative. For example, a bronze player is enabled to continue playing with a negative credit meter with a buy-in of $200, while a silver player is enabled to continue playing with a negative credit meter with a buy-in of $100.

It should be appreciated that the negative credit meter feature may be implemented by giving the player designated extra amount on the credit meter that the player can play with. It should be appreciated that the negative credit meter feature may be implemented by giving a designated number of free plays.

It should be appreciated that as mentioned above, the present disclosure contemplates employing the negative credit meter feature in a guaranteed play mode which guarantees the player a number of plays of the game for a predetermined amount of money. The system enables the credit meter to go negative for a designed amount of plays or designated amount of money.

It should also be appreciated that the credit meter can be configured in any suitable manner to clearly indicate a negative balance to the player. For example, a negative sign can be used in conjunction with one or more other indicators such as different colors or shapes of the negative credits displayed by the credit meter.

It should be appreciated that differing from promotional credits, the determined enhanced wagering opportunities are instantaneously provided to a player. That is, the moment the player qualifies for a enhanced wagering opportunity, the enhanced wagering opportunity may be provided on the player's currently played gaming device. Such a configuration further enables immediate access to an enhanced wagering opportunity utilizing the gaming device the player is currently playing and does not require the player to make another trip to the gaming establishment at another time to obtain their enhanced wagering opportunity.

In one embodiment, the gaming system configuration provides the central server the ability to control the signage for the gaming machines in the gaming system. In one embodiment, each individual sign is associated with a sign controller which is connected to or otherwise associated with the central controller. In one embodiment, the central server communicates with the sign controller(s) and instructs what content to display, where to display such content, how to display such content and for how long to display such content. In one embodiment, the sign controller displays any information as long as it has the proper content manager. For example, the sign controller causes a sign to display a recently provided enhanced wagering opportunity on a gaming machine (or bank of gaming machines). In one embodiment, auxiliary devices, such as player tracking information terminals, have signs which are also connected to the sign controllers in communication with the central server. It should be appreciated that the sign controller is programmed on a loop to display a plurality of information not only on a single sign, but also on other sign in a gaming establishment as well. It should be further appreciated that such information can be provided to the players through any suitable audio, audio-visual or visual devices.

By utilizing of the central server to communicate with each sign controller, the gaming system presents a wealth of information to the player. Furthermore, the central server and sign controller configuration enables for the signs to be custom tailored to the player who is playing each gaming device to provide the player with information that will be most beneficial to their gaming session.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) if an amount indicated by a credit meter is less than a maximum wager amount and if a determination is to not enable a player to place the maximum wager amount:

(i) enable the player to place a non-maximum wager amount to play a first game associated with a first average expected payback percentage, and (ii) display the play of the first game; and (b) if the amount indicated by the credit meter is less than the maximum wager amount and if the determination is to enable the player to place the maximum wager amount:

(i) enable the player to place the maximum wager amount to play a second game associated with a second average expected payback percentage which is greater than the first average expected payback percentage, and (ii) display the play of the second game.

2. The gaming system of claim 1, wherein the credit meter indicates an amount of monetary credits.

3. The gaming system of claim 1, wherein the placed wager amount includes an amount of monetary credits.

4. The gaming system of claim 1, wherein said determination of whether to enable the player to place said maximum wager amount is based, at least in part, on at least one selected from the group consisting of: a fee paid by the player, a fee paid by a gaming establishment marketing department, a fee paid from an enhanced wagering opportunity pool, a number of wagers of the maximum wager amount placed by the player during a time period, and information received from a player tracking system, said information being associated with the player.

5. The gaming system of claim 1, which includes a housing, and a plurality of input devices supported by the housing, said plurality of input devices including an acceptor, and a cashout device, and when executed by the at least one processor, the plurality of instructions cause the at least one processor to operate with the plurality of input devices to: if a physical item is received via the acceptor, cause an increase of the credit meter based, at least in part, on a monetary value associated with the received physical item, and if a cashout input is received via the cashout device, cause an initiation of any payout associated with the credit meter.

6. A gaming system server comprising:

at least one processor; and at least one memory device which stores a plurality of instructions, which when executed by the at least one processor, cause the at least one processor to:

(a) if an amount indicated by a credit meter is less than a maximum wager amount and if a determination is to not enable a player to place the maximum wager amount:

(i) enable the player to place a non-maximum wager amount to play a first game associated with a first average expected payback percentage, and (ii) cause at least one display device to display the play of the first game; and (b) if the amount indicated by the credit meter is less than the maximum wager amount and if the determination is to enable the player to place the maximum wager amount:

(i) enable the player to place the maximum wager amount to play a second game associated with a second average expected payback percentage which is greater than the first average expected payback percentage, and (ii) cause the at least one display device to display the play of the second game.

7. The gaming system server of claim 6, wherein the credit meter indicates an amount of monetary credits.

8. The gaming system server of claim 6, wherein the placed wager amount includes an amount of monetary credits.

9. The gaming system server of claim 6, wherein said determination of whether to enable the player to place said maximum wager amount is based, at least in part, on at least one selected from the group consisting of: a fee paid by the player, a fee paid by a gaming establishment marketing department, a fee paid from an enhanced wagering opportunity pool, a number of wagers of the maximum wager amount placed by the player during a time period, and information received from a player tracking system, said information being associated with the player.

10. The gaming system server of claim 6, wherein any awards for any play of the first game and any play of the second game cause an increase of the credit meter which is increasable via an acceptor of a physical item associated with a monetary value, and decreasable via a cashout device configured to receive an input to cause an initiation of a payout associated with the credit meter.

11. A method of operating a gaming system, said method comprising:

(a) if an amount indicated by a credit meter is less than a maximum wager amount and if a determination is to not enable a player to place the maximum wager amount:

(i) enabling the player to place a non-maximum wager amount to play a first game associated with a first average expected payback percentage, and (ii) causing at least one display device to display the play of the first game; and (b) if the amount indicated by the credit meter is less than the maximum wager amount and if the determination is to enable the player to place the maximum wager amount:

(i) enabling the player to place the maximum wager amount to play a second game associated with a second average expected payback percentage which is greater than the first average expected payback percentage, and (ii) causing the at least one display device to display the play of the second game.

12. The method of claim 11, wherein the credit meter indicates an amount of monetary credits.

13. The method of claim 11, wherein the placed wager amount includes an amount of monetary credits.

14. The method of claim 11, wherein said determination of whether to enable the player to place said maximum wager amount is based, at least in part, on at least one selected from the group consisting of: a fee paid by the player, a fee paid by a gaming establishment marketing department, a fee paid from an enhanced wagering opportunity pool, a number of wagers of the maximum wager amount placed by the player during a time period, and information received from a player tracking system, said information being associated with the player.

15. The method of claim 11, wherein any awards for any play of the first game and any play of the second game cause an increase of the credit meter which is increasable via an acceptor of a physical item associated with a monetary value, and decreasable via a cashout device configured to receive an input to cause an initiation of a payout associated with the credit meter.

16. The method of claim 11, which is provided through a data network.

17. The method of claim 16, wherein the data network is an internet.

* * * * *